(12) United States Patent
Goda et al.

(10) Patent No.: US 10,951,684 B2
(45) Date of Patent: Mar. 16, 2021

(54) INFORMATION PROCESSING SYSTEM, INFORMATION PROCESSING METHOD, USER TERMINAL AND STORAGE MEDIUM

(71) Applicant: NINTENDO CO., LTD., Kyoto (JP)

(72) Inventors: Teruhiko Goda, Kyoto (JP); Naoki Takeda, Kyoto (JP); Eiji Tokunaga, Kyoto (JP); Koichi Nakao, Kyoto (JP)

(73) Assignee: NINTENDO CO., LTD., Kyoto (JP)

( * ) Notice: Subject to any disclaimer, the term of this patent is extended or adjusted under 35 U.S.C. 154(b) by 745 days.

(21) Appl. No.: 14/498,723

(22) Filed: Sep. 26, 2014

(65) Prior Publication Data

US 2015/0095457 A1 Apr. 2, 2015

(30) Foreign Application Priority Data

Sep. 27, 2013 (JP) .............................. JP2013-200850

(51) Int. Cl.
*G06F 15/16* (2006.01)
*H04L 29/08* (2006.01)
*H04L 29/04* (2006.01)

(52) U.S. Cl.
CPC .............. *H04L 67/06* (2013.01); *H04L 29/04* (2013.01)

(58) Field of Classification Search
None
See application file for complete search history.

(56) References Cited

U.S. PATENT DOCUMENTS

| | | | | |
|---|---|---|---|---|
| 6,532,591 | B1 * | 3/2003 | Arai | H04N 21/26283 725/132 |
| 2009/0029776 | A1 * | 1/2009 | Ruppert | H04L 12/00 463/42 |
| 2009/0247145 | A1 * | 10/2009 | Lee | H04N 21/2362 455/419 |
| 2010/0011090 | A1 * | 1/2010 | Gordon | H04L 67/325 709/218 |
| 2010/0082741 | A1 * | 4/2010 | Kawada | H04L 29/06 709/203 |
| 2010/0255890 | A1 * | 10/2010 | Mikkelsen | G06Q 10/06 455/567 |

(Continued)

FOREIGN PATENT DOCUMENTS

JP 2005-250622 9/2005
JP 2006114967 A * 4/2006

(Continued)

OTHER PUBLICATIONS

U.S. Appl. No. 14/498,649, filed Sep. 26, 2014.

(Continued)

*Primary Examiner* — Phyllis A Book
(74) *Attorney, Agent, or Firm* — Nixon & Vanderhye, P.C.

(57) ABSTRACT

A non-limiting example information processing system includes a plurality of user terminals, and a download task list for each user terminal is managed by a list server. Existence/non-existence of renewal of the download task list is managed by a revision server, and the user terminal inquires of the revision server the existence/non-existence of the renewal. If the download task list is renewed, the user terminal acquires the download task list from the list server, and acquires a content from a content server according to an acquired download task list.

14 Claims, 8 Drawing Sheets

(56) References Cited

U.S. PATENT DOCUMENTS

| | | | | |
|---|---|---|---|---|
| 2011/0067093 | A1* | 3/2011 | Kamada | G06F 21/10 |
| | | | | 726/7 |
| 2012/0278444 | A1* | 11/2012 | Ohkita | H04W 4/206 |
| | | | | 709/219 |
| 2013/0104121 | A1* | 4/2013 | Iwaya | G06F 8/61 |
| | | | | 717/174 |
| 2014/0298041 | A1* | 10/2014 | Consalus | G06F 21/552 |
| | | | | 713/193 |

FOREIGN PATENT DOCUMENTS

| | | | |
|---|---|---|---|
| JP | 2006114967 A | * | 4/2006 |
| JP | 2007-310767 | | 11/2007 |
| JP | 2012-003329 | | 1/2012 |
| JP | 2012-146241 | | 8/2012 |

OTHER PUBLICATIONS

Office Action dated Feb. 15, 2017 in U.S. Appl. No. 14/498,649.
English-language machine translation of JP2007-310767.
English-language machine translation of JP2012-146241.
Final Office Action dated Aug. 24, 2017 in U.S. Appl. No. 14/498,649.
Non-Final Office Action dated Jan. 18, 2018 in U.S. Appl. No. 14/498,649.
Final Office Action dated Aug. 6, 2018 in U.S. Appl. No. 14/498,649 and PTO-892 Form.
Final Office Action dated Jun. 27, 2019 in U.S. Appl. No. 14/498,649.
Interview Summary Form dated Aug. 13, 2019 in U.S. Appl. No. 14/498,649.
Final Office Action dated Jan. 11, 2019 in U.S. Appl. No. 14/498,649 and PTO-892 Form.

* cited by examiner (A) TERMINAL DTL (B) GROUP DTL

INFORMATION PROCESSING SYSTEM, INFORMATION PROCESSING METHOD, USER TERMINAL AND STORAGE MEDIUM

CROSS REFERENCE OF RELATED APPLICATION

The disclosure of Japanese patent application No. 2013-200850 filed on Sep. 27, 2013 is incorporated by reference.

FIELD

This application describes an information processing system, information processing method, user terminal, and storage medium, distributing a content to a user terminal.

SUMMARY

It is a primary object of embodiments to provide a novel information processing system, information processing method, user terminal, and a storage medium.

It is another object of the embodiments to provide an information processing system, information processing method, user terminal, and storage medium, capable of reducing a processing load on a side of server.

A first embodiment is an information processing system comprising a first server and a user terminal. The first server comprises an information storing module, an information transmitting module, a content storing module, and a content transmitting module. The user terminal comprises an information acquiring module, a content requesting module, a content storing module, and a content acquiring module.

The information storing module of the first server stores download information related to a download for each of a plurality of user terminals or for each of uses of the plurality of user terminals. The information transmitting module transmits download information for the user terminal or the user of the user terminal in response to a request from the user terminal. In the user terminal, the information acquiring module acquires the download information that is transmitted from the information transmitting module. In addition, the content requesting module of the user terminal requests transmission of a content to the first server according to the download information that is acquired by the information acquiring module. In response to this request, the content transmitting module of the first server transmits a content that is stored in the content storing module. Therefore, the user terminal acquires the content that is transmitted from the content transmitting module.

According to the first embodiment, the user terminal acquires the content according to acquired download information, the first server may manage only the download information, and the acquisition of the content is managed by the user terminal. Therefore, a processing load on a side of the first server can be reduced.

A second embodiment is according to the first embodiment, wherein the user terminal further comprises an accessing module. The accessing module accesses the first server according to the existence/non-existence of renewal of the download information.

According to the second embodiment, since the user terminal is caused to access the first server only when needed, the processing load on the side of the first server can be reduced.

A third embodiment is according to the second embodiment, wherein the user terminal further comprises an information requesting module. The information requesting module requests to the first server, when the renewal of the download information exists, transmission of the download information by causing the accessing module to access the first server.

According to the third embodiment, by acquiring renewed download information, a content can be acquired according to acquired newest download information.

A fourth embodiment is according to the second embodiment, wherein the information processing system further comprises a second server that manages the existence/non-existence of the renewal of the download information. The user terminal further comprises an inquiry module that inquires of the second server the existence/non-existence of the renewal of the download information.

According to the fourth embodiment, since the existence/non-existence of the renewal of the download information is inquired to the second server, the processing load on the side of the first server can be reduced.

A fifth embodiment is according to the first embodiment, wherein the user terminal further comprises an additional information acquiring module. The additional information acquiring module acquires additional information that is added to the content.

According to the fifth embodiment, the additional information added to the content as well as the content can be acquired.

A sixth embodiment is according to the first embodiment, wherein the download information contains different kinds of download tasks.

According to the sixth embodiment, the content that is purchased by the user and the content that is registered by the administrator, for example can be distinguished according to the kind of download task.

A seventh embodiment is according to the sixth embodiment, wherein the user terminal performs different operations at a time that the content acquiring module acquires the content according to the kind of download task. For example, although not notified at all for the content that the user himself/herself purchases, in a case of the content presented by other users, the user is notified of so. Furthermore, when a message from other users exists, the message is also notified. In addition, if it is the content that the administrator registers, it is notified that the content is distributed by the administrator. Furthermore, as for the content distributed by the administrator, when there is information on rating, the rating is displayed so as to obtain consent of the user.

According to the seventh embodiment, representation (action) in the user terminal can be changed by changing the kind of download task according to ways how to register a content or person who register a content.

An eighth embodiment is according to the sixth embodiment, wherein different identification information is applied to each of the download tasks, and the user terminal manages whether each of the download tasks is to be performed with using the identification information. Therefore, even if a content is the same content as the already acquired content, for example, when the content is again purchased by the user or is again registered by the administrator, different identification information is applied to the download task.

According to the eighth embodiment, different identification information is applied to the download task of the same content as the already acquired content, for example, and each of the download tasks is managed with using the identification information, and accordingly, it is possible to acquire the deleted content again.

A ninth embodiment is according to the eighth embodiment, wherein the user terminal further comprises a success recording module. The success recording module records, when the acquisition of the content by the content acquiring module is successful, that the acquisition of the content is successful corresponding to the identification information of the download task for the content.

According to the ninth embodiment, since it is recorded that the acquisition of content is successful corresponding to the identification information of the download task for the content, it is possible to easily know whether the content is acquired.

A tenth embodiment is according to the ninth embodiment, wherein the content requesting module does not request the transmission of the content when it is recorded corresponding to the identification information of the download task that the acquisition of the content is successful.

According to the tenth embodiment, since the transmission of the content is not requested when it is recorded that the acquisition of the content is successful, even if the content having acquired is deleted with an intention of the user, it is possible to prevent requesting or requesting repeatedly.

An eleventh embodiment is according to the eighth embodiment, wherein the user terminal further comprises a failure recording module. The failure recording module records, when the acquisition of the content by the content acquiring module is unsuccessful, that the acquisition of the content is unsuccessful corresponding to the identification information of the download task for the content.

According to the eleventh embodiment, since it is recorded that the acquisition of the content is unsuccessful corresponding to the identification information of the download task for the content, it is possible to easily know that the content is not acquired.

A twelfth embodiment is according to the eleventh embodiment, wherein the content requesting module requests again the transmission of the content when it is recorded that the acquisition of the content is unsuccessful corresponding to the identification information of the download task.

According to the twelfth embodiment, since the transmission of the content is again requested when it is recorded that acquisition of content is unsuccessful, it is possible to surely acquire the content.

A thirteenth embodiment is according to the first embodiment, wherein the first server comprises a download information server that comprises the information storing module and the information transmitting module, and a content server that comprises the content storing module and the content transmitting module.

According to the thirteenth embodiment, it is possible to divide, according to a role, the first server into two servers, the down load information server and the content server.

A fourteenth embodiment is an information processing method in an information processing system comprising first server comprising a content storing module that stores a content and an information storing module that stores download information related to each of a plurality of user terminals or each of users of the plurality of the user terminals, and a user terminal, comprising steps of: (a) the first server transmits the download information for the user terminal in response to a request from the user terminal; (b) the user terminal acquires the download information that is transmitted in the step (a) to store in a storage medium; (c) the user terminal requests, according to the download information that is acquired in the step (b), transmission of a content to the first server; (d) the first server transmits, in response to a request from the user terminal, a content that is stored in the content storing module; and (e) the user terminal acquires the content that is transmitted in the step (d) to store in the storage medium.

A fifteenth embodiment is a user terminal that is communicably connected to a first server comprising an information storing module that stores download information related to each of a plurality of user terminals or each of users of the plurality of the user terminals, an information transmitting module that transmits the download information for the user terminal in response to a request from the user terminal, a content storing module that stores a content and a content transmitting module that transmits a content that is stored in the content storing module in response to a request from the user terminal, one or more processors of the user terminal: acquire the download information that is transmitted from the information transmitting module; request the first server transmission of a content according to the download information that is acquired by the information acquiring module; and acquire the content that is transmitted from the content transmitting module in response to the request by the content request module.

A sixteenth embodiment is a non-transitory computer readable storage medium storing an information processing program of a user terminal that is communicably connected to a first server comprising an information storing module that stores download information related to each of a plurality of user terminals or each of users of the plurality of the user terminals, an information transmitting module that transmits the download information for the user terminal in response to a request from the user terminal, a content storing module that stores a content, and a content transmitting module that transmits a content that is stored in the content storing module according to a request from the user terminal, the information processing program causes a computer of the user terminal to function as: an information acquiring module that acquires the download information that is transmitted from the information transmitting module to store in a storage medium; a content request module that requests the first server transmission of a content according to the download information that is acquired by the information acquiring module; and a content acquiring module that acquires the content that is transmitted from the content transmitting module in response to a request by the content requesting module to store in the storage medium.

In the fourteenth to sixteenth embodiments, the processing load on the side of the first server can be reduced like the first embodiment.

The above described objects and other objects, features, aspects and advantages of the embodiments will become more apparent from the following detailed description when taken in conjunction with the accompanying drawings.

DETAILED DESCRIPTION OF NON-LIMITING EXAMPLE EMBODIMENTS

Figure 1:
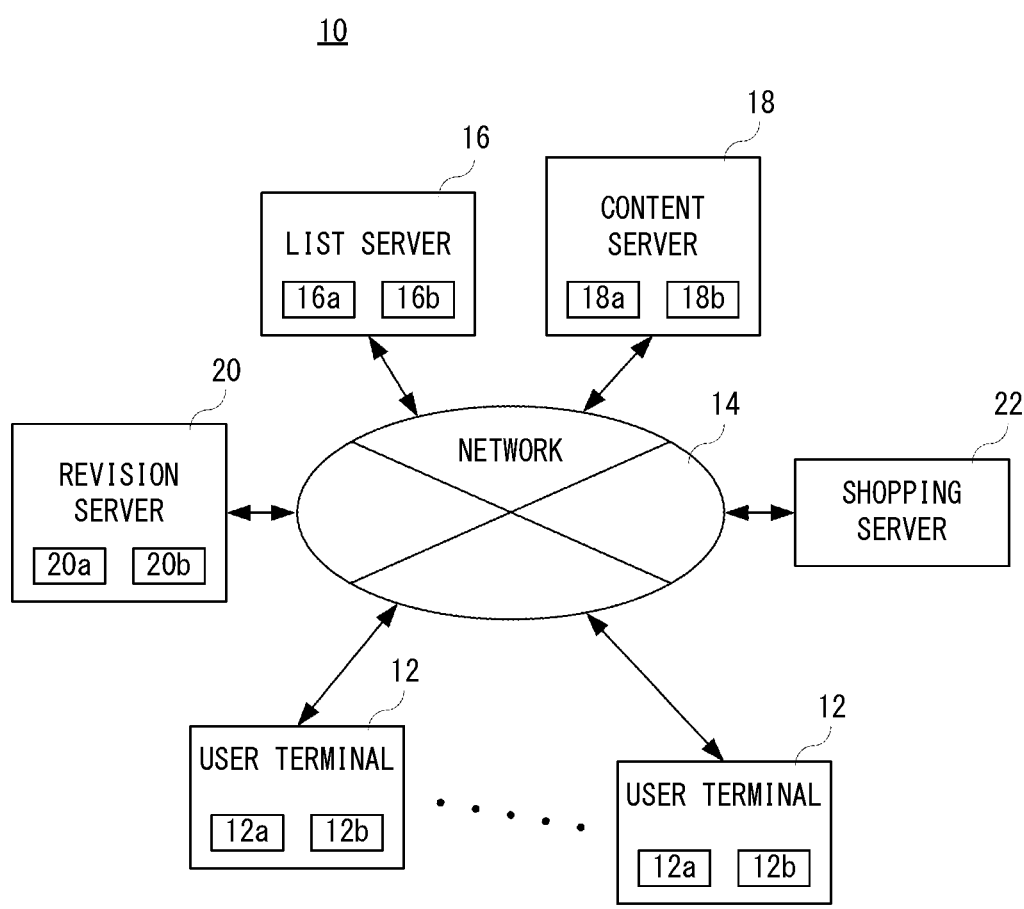
FIG. 1 is a block diagram of a non-limiting example information processing system.

With referring to FIG. 1, a non-limiting example information processing system 10 includes a plurality of user terminals 12, and each user terminal 12 is connected, via a network 14 such as an internet, to a list server 16, a content server 18, a revision server 20 and a shopping server 22 by a wire or cable or in a wireless manner. Therefore, each of the user terminals 12, the list server 16, the content server 18, the revision server 20 and the shopping server 22 can communicate with each other.

The user terminal 12 is a general-purpose game machine, and comprises components such as a CPU 12a, a RAM 12b, etc. Although illustration is omitted, the user terminal 12 has a display that is separately provided from a main body and a controller. However, the user terminal 12 may be a device that a main body is integrally provided with a display and a controller.

The user terminal 12 can perform a predetermined application program such as a game program. A content such as the predetermined application program can acquired from a predetermined recording medium such as a CD, DVD or SD card attached to the user terminal 12, or can also acquire from a predetermined server (in this embodiment, the content server 18) through the network 14. In this embodiment, the user terminal 12 means a terminal that uses the content acquired from the content server 18 out of the terminals that the user possesses or owns. Then, other terminals other than user terminal 12 mean terminals that do not acquire or use the content from the content server 18 out of the terminals that the user possesses or owns. Other typical examples of a terminal are a smartphone, a feature phone and a PC such as a tablet PC.

The list server 16 is a general-purpose server that manages the information (download information) for distributing the content to the user terminal 12 from the content server 18. The list server 16 comprises components such as a CPU 16a, a memory 16b like HDD, etc. In this embodiment, the download information is a list (download task list) that describes tasks for performing download.

In addition, in this embodiment, two kinds of download task lists exist. One is a download task list that is managed for each user terminal 12. The other is a download task list that is managed for each group in a case where the plurality of user terminals 12 are grouped with a predetermined classification. Although a group is classified per country (or fixed domain) in this embodiment, there is no necessity of being limited to this. Instead of a country or in addition to a country, the user terminals may be classified according to a version of the user terminal 12 or a version of an operating system thereof. When there are two or more elements to classify, the user terminal 12 may belong to two or more groups.

Hereinafter, the download task list managed for each user terminal 12 is called as "terminal DTL", and the download task list managed for each group is called as "group DTL". However, when there is no necessity of distinguishing the terminal DTL and the group DTL, the list may be simply called as "download task list".

Although a detailed description is omitted, the list server 16 stores the terminal DTL and the group DTL in its internal memory 16b, and transmits (distributes), under instructions of the CPU 16a, the terminal DTL and the group DTL to the user terminal 12 in response to a request from the user terminal 12. In addition, the list server 16 stores a table that describes identification information of the user (user ID) and identification information of the group (group ID) in the internal memory 16b corresponding to identification information of the user terminal 12 (terminal ID) in order to manage the terminal DTL and the group DTL. In addition, a plurality of users can be registered in the user terminal 12, and the user ID is set for each user.

In addition, although the user ID that is registered in the user terminal 12 is used in this embodiment, identification information (network ID) that is assigned by the administrator of a server (in this embodiment, the shopping server 22) that the user purchases a content through the network 14 may be used. Thus, when using the network ID for acquisition of a content, in the user terminal 12, the content server 18 and the revision server 20, the network ID is used in place of the user ID. Otherwise, the table that is stored with the network ID corresponding to the user ID is referred to.

The content server 18 is a general-purpose server for distributing a content to the user terminal 12. The content server 18 comprises components such as a CPU 18a and a memory 18b like HDD, and stores (manages) the content in the memory 18b (management), and distributes, under instructions of the CPU 18a, the content to the user terminal 12 in response to a request from the user terminal 12. Although a detailed description is omitted, in order to perform user authentication to the user of the user terminal 12 having accessed the content server 18, the content server 18 stores a table that describes the terminal ID of the user terminal 12 and the user ID registered in the user terminal 12 in the internal memory 18b. In addition, a list (distribution list) that is stored with, corresponding to the identification information (content ID) of the content to be distributed, the user ID of the user to whom the content should be distributed in the internal memory 18b. As mentioned above, in this embodiment, the content is a predetermined application program such as a game program. However, there may not be any necessity of being limited to a program, and a content may be other content such as image data, sound (music) data, and character (book) data.

The revision server 20 is a general-purpose server that manages information indicating whether the terminal DTL and the group DTL that are managed by the list server 16 are renewed. The revision server 20 comprises components such as a CPU 20a and a memory 20b like a HDD, and stores, corresponding to the terminal ID, information (renewal information) indicating whether the terminal DTL is renewed and information (renewal information) indicating whether the group DTL is renewed in the internal memory 20b. Although a detailed description is omitted, the revision server 20 needs to know the group that the user terminal 12 shown by the terminal ID belongs. Therefore, the revision server 20 stores, corresponding to the group ID, a table that describes the terminal ID of the user terminal 12 belonging to the group indicated by the group ID in the internal memory 20b. In addition, the revision server 20 notifies, under instructions of the CPU 20*a*, the renewal information of the terminal DTL and the group DTL to the user terminal 12 in response to an inquiry from the user terminal 12.

The shopping server 22 is a general-purpose server that the user searches a content to acquire (purchase) or determines (registers) to acquire (purchase) a desired content with using the user terminal 12. However, the user can search a content or determine to acquire, using another terminal. In such a case, the shopping server 22 specifies a purchaser of the content by making the user input the terminal ID of the user terminal 12 that the user uses and the user ID. Although a detailed description is omitted, since information relating to the purchaser of the content and information of the user terminal 12 that the content should be distributed are needed to the shopping server 22, a table that describes the user ID registered in each user terminal 12 corresponding to the terminal ID of each user terminal 12 is stored in the internal memory (HDD, etc.). In addition, a table that describes the content ID corresponding to a content that the content server 18 can distribute and information of a distribution source ("URL of a distribution source" described later) is also stored in the internal memory.

In addition, when searching a content or determining to acquire (purchase) the content with using another terminal such as a smartphone or a feature phone, for example, there is an occasion that the shopping server 22 is accessed through a telephone network and the network 14.

Furthermore, as mentioned above, since each user terminal 12, the list server 16, the content server 18, the revision server 20 and the shopping server 22 can make a communication with each other, these comprise a communication function, respectively.

In such the information processing system 10, as mentioned above, the user can determine to acquire (purchase) a content for himself/herself, or to acquire a content for other persons with using own user terminal 12 by accessing the shopping server 22. However, other persons contain not only other users who use other user terminals 12 but other users who use the same user terminal 12.

In addition, since the searching a desired content, and the determining to acquire (purchase) the desired content by accessing the shopping server 22 have been well-known, a detailed description is omitted.

When determining to acquire a content, the shopping server 22 notifies to the list server 16 the content ID of the content, the URL of the distribution source, the user ID of the user (purchaser) who determines to acquire the content, and the user ID of the user (acquirer) who should acquire the content. In addition, the shopping server 22 notifies to the content server 18 the content ID of the content that is determined to be acquired and the user ID of the acquirer of the content. Furthermore, the shopping server 22 notifies to the revision server 20 the user ID of the acquirer of the content that is determined to be acquired.

Figure 2:
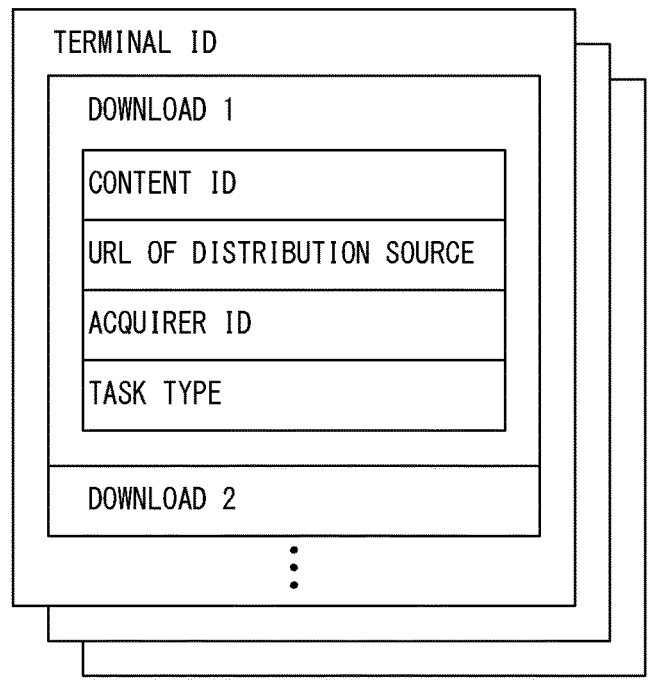
FIG. 2 is a view showing non-limiting examples of a terminal download task list and a group download task list that are stored in a list server.
Figure 2:
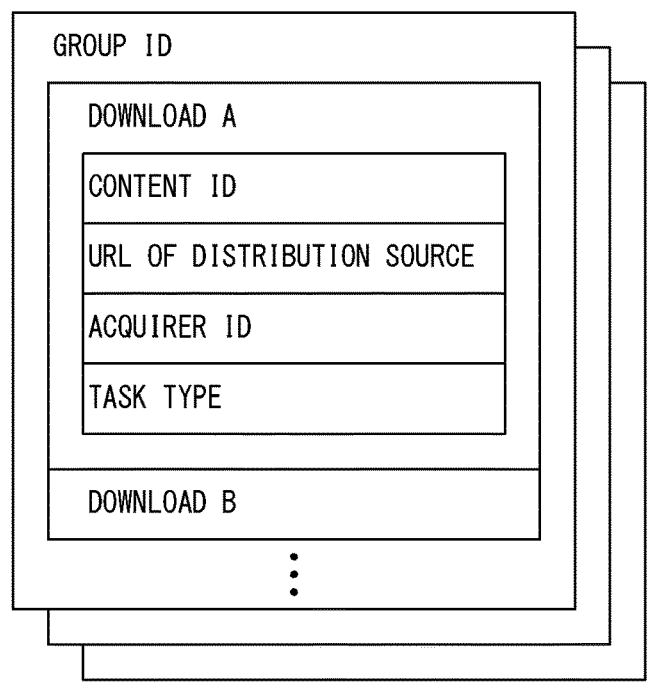

Then, in the list server 16, a download task is generated by the CPU 16*a* and the terminal DTL (refer to FIG. 2(A)) for the user terminal 12 that the user ID of the acquirer is registered is renewed. That is, the list server 16 generates the download task using the content ID, the URL of a distribution source, the user ID of the purchaser and the user ID of the acquirer that are respectively acquired from the shopping server 22. Then, the list server 16 specifies the terminal ID of the user terminal 12 of the acquirer with referring to the table stored in the internal memory 16*b*, and adds the download task to the terminal DTL that the terminal ID that is specified is applied.

In addition, in the content server 18, the user ID of the acquirer is registered in the distribution list of the content by the CPU 18*a* corresponding to the content ID. Furthermore, in the revision server 20, it is registered that the information of the terminal DTL of the user terminal 12 that the user ID of the acquirer is registered is renewed. That is, the revision server 20 specifies the terminal ID of the user terminal 12 that the user ID of the acquirer is registered with referring to the table stored in the internal memory 20*b*, and describes that the terminal DTL is renewed as the renewal information that is stored corresponding to the terminal ID being specified.

In addition, in this embodiment, if it is determined that the content is acquired, the shopping server 22 notifies individually the information required for each of the list server 16, the content server 18 and the revision server 20, but there is no necessity of being limited to this. The shopping servers 22 may notify to all the list servers 16, the content servers 18 and revision servers 20 the content ID of the content that is determined to be acquired, the URL of the distribution source, the user ID of the purchaser and the user ID of the acquirer such that each server (16, 18, 20) uses the information selectively.

As shown in FIG. 2(A), the terminal ID is applied to each terminal DTL, and made to be corresponding to the user terminal 12 that the terminal ID is assigned. In the terminal DTL's the download task for the content that the user terminal 12 indicated by the terminal ID acquires is described for each content. A plurality of download tasks are described in the example shown in FIG. 2(A). Identification information (task ID) is applied to each task. In the example shown in FIG. 2(A), although a name such as Download 1, Download 2, - - - are described as the task ID, there is no necessity of being limited to this, and as long as identification is possible between the tasks, numerals, the alphabet or signs that a human being cannot decode may be used. This is true for the task ID applied to the group DTL.

A content ID, a URL of the distribution source, an acquirer ID and a task type are described in each download task. The content ID is identification information of the content that is distributed from the content server 18, as mentioned above. The URL of the distribution source is an address of the distribution source of the content (in this embodiment, the content server 18) indicated by the content ID, and also specifies the content. The acquirer ID is the user ID that is assigned to the acquirer of the content that is distributed from the content server 18. However, as mentioned above, when using the network ID, the network ID that is assigned to the acquirer of the content may be described as the acquirer ID. The task type is a kind of the download task, and is classified into three kinds (Type 1, Type 2, and Type 3) in this embodiment.

Type 1 is a kind of the download task for a content that the purchaser determines to acquire for own the content. That is, in a case where the user ID of the purchaser and the user ID of the acquirer that are notified from the shopping server 22 are coincident with each other, the task type is determined as Type 1.

Type 2 is a kind of the download task for a content that the purchaser determines to make another person acquire (to present). That is, in a case where the user ID of the purchaser and the user ID of the acquirer that are notified from the shopping server 22 are not coincident with each other, the task type is determined as Type 2.

Type 3 is a kind of the download task for a content that is registered by the administrator. The download task of Type 3 is registered in the group DTL, as described later.

In addition, there is no necessity that the task type is limited to these, and as long as two or more kinds, the task may be classified into more kinds.

In addition, there is an occasion that the administrator of the content server 18 registers the content. For example, a free content or a content such as a program that is changed in its version, or a patch program correspond. The content that is registered by the administrator is distributed to all or a part of groups of the plurality of users. Therefore, the administrator designates the group (group ID) that the content is to be distributed to when registering the content. Then, the content ID, the URL of the distribution source and the group ID are notified to the list server 16 from the content server 18. In addition, the group ID is notified to the revision server 20 from the content server 18. Therefore, in the list server 16, the group DTL (FIG. 2(B)) that is applied with the group ID that is notified is renewed by CPU 16a. In addition, in the revision server 20, it is described that the group DTL is renewed as the renewal information corresponding to the terminal ID included in the group that is indicated by the group ID by CPU 20a.

As shown in FIG. 2(B), the group ID is applied to each group DTL. The download task for the content that a plurality of user terminals 12 included in the group to which the group ID is assigned acquire is described for each content in the group DTL. A plurality of download tasks are described for each group. As mentioned above, the task ID is applied to the download task. In an example shown in FIG. 2(B), names like Download A, Download B, - - - are described as the download task ID. In addition, the content ID, the URL of the distribution source and the task type are described in each download task. These are the same as those in the case of the terminal DTL, a duplicate description is omitted.

In addition, since the content that is acquired based on the group DTL is what is distributed per user terminal 12, and is not distributed per user, in the download task included in the group DTL, the user ID is not described as the acquirer ID. For example, null data is described. Thus, the data formats of the terminal DTL and the group DTL are made identical.

For example, in the user terminal 12, in a power-saving mode like a sleep state, the download task list is renewed, and the distribution of the content is received based on the renewed download task list. Specifically, if the user terminal 12 is shifted to the sleep state according to instructions of the user, the user terminal 12 inquires of the revision server 20 the existence/non-existence of renewal of the download task list for every predetermined time period (60 minutes, for example). In addition, it is possible for the user terminal 12 to inquire the revision server 20 in an active state according to instructions of the user. It should be noted that the active state means a state that an arbitrary application program can be executed.

When the notice of there being no renewal of the download task list is received from the revision server 20, as long as there are no instructions of starting the user terminal 12, the user terminal 12 maintains the sleep state and stands by a next inquiry timing.

On the other hand, if the notice of there being renewal of the download task list is received from the revision server 20, the user terminal 12 accesses the list server 16 to acquire the download task list. Although the user terminal 12 acquires both the terminal DTL and the group DTL in this embodiment, only the renewed download task list may be acquired.

In addition, the revision server 20 resets the renewal information of the user terminal 12 when notifying the existence/non-existence of renewal of the download task list to the user terminal 12. It is described as the renewal information that there is no renewal of the download task list in this embodiment.

The user terminal 12 generates (renews), when acquiring the download task list from the list server 16, a list that information indicative of a status thereof is added to each download task (hereinafter, called as "task registration status list" in this embodiment). When generating a task registration status list for the first time, all the download tasks that are described in the terminal DTL and all download tasks that are described in the group DTL are registered. The task registration status list is renewed at every time that the terminal DTL and the group DTL are acquired such that the download task that is added to the terminal DTL or the group DTL is added, and the download task that is deleted from the terminal DTL or the group DTL is deleted.

Figure 3:
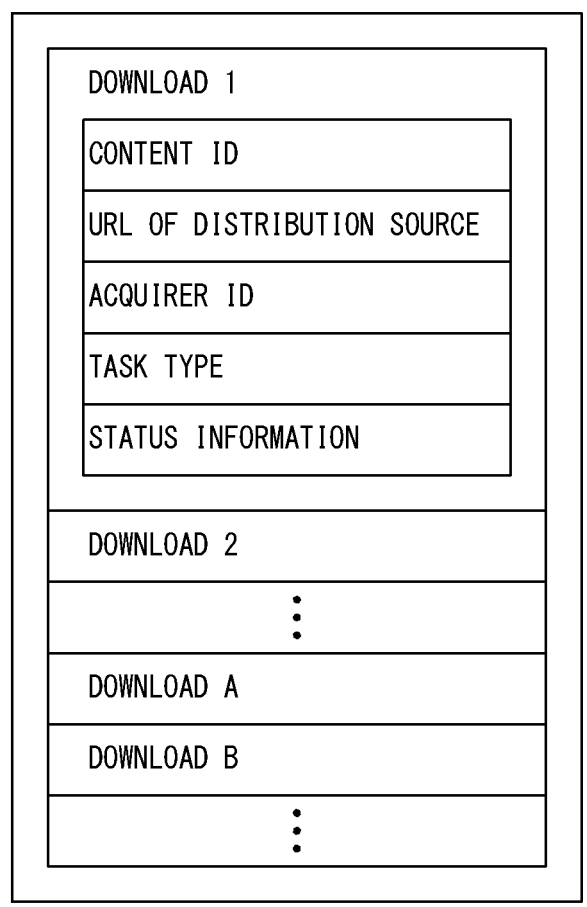
FIG. 3 is a view showing a non-limiting example task registration status list that is generated and renewed by a user terminal.

An example of the task registration status list is shown in FIG. 3. As shown in FIG. 3, status information is described in the download task other than the content ID, the URL of the distribution source and the acquirer ID. The content ID, the URL of the distribution source and the acquirer ID are as having mentioned above. The status information is data that indicates a status of the download task, and is constituted by a 2-bit register, for example. In the beginning when the download task is registered, a data value "00" is set in the register when the download task is not performed. In addition, when although the download task is performed the acquisition of the content is failed, a data value "01" is set in the register. Furthermore, when the download task is performed and the acquisition of the content is successful, a data value "10" is set in the register.

Thus, since the status is managed by applying the task ID for each download task, the download task that is succeeded in the download is not performed repeatedly. Therefore, since the data value of the register constituting the status information is "10" even in a case where the content that is succeeded in the download is deleted from the user terminal 12 by an intention of the user, for example, the content is not acquired again. However, since another task ID is applied to the download task when the download task for the content that is deleted is newly registered by instructions of the user or the administrator, in such a case, the content that is the same as the content that is deleted is acquired again.

In addition, since the terminal DTL and the download DTL that are stored in the list server 16 include information for the content that the user acquires, etc., a level of security is made higher such that these DTLs cannot be seen or altered by a third person. Accordingly, when not providing the revision server 20, it is necessary to access the list server 16 to inquire the existence/non-existence of renewal of the download task list, and therefore, a communication frequency becomes high in the list server 16. In addition, since encryption is also applied to the communication with the list server 16, there is much data volume in communication. That is, it is possible to say that the processing load of the list server 16 is very large.

In contrast, since the user terminal 12 accesses the list server 16 only when the download task list is renewed by providing the revision server 20 in this embodiment, it is possible to lessen the number of times that the user terminal 12 accesses the list server 16 as much as possible. Accordingly, the processing load of the list server 16 is reduced.

However, it is necessary to provide the revision server 16, but only the renewal information is stored in the revision server 16, and therefore, even if the renewal information is seen or altered by a third person, no problem occurs, and thus, it does not have to make the level of security higher. That is, it is possible to provide the revision server 16 at low cost.

In addition, the user terminal 12 acquires the content according to the task registration status list. For example, the user terminal 12 determines, at every predetermined time period (60 minutes, for example), whether there is a content that should be acquired with referring to the task registration status list. In this embodiment, the content that should be acquired means the content not having succeeded in acquisition. Accordingly, a content corresponding to the content ID described in the download task that the data value of the status information is "00" or "01" is a content that should be acquired.

If there is a content that should be acquired, the download task for the content is performed. Accordingly, the user terminal 12 accesses the content server 18 according to the URL of the distribution source that is described in the download task and transmits a request of transmission of the content that is indicated by the content ID, after performing the predetermined processing such as user authentication, etc.

In the content server 18, it is determined whether there is any content that should be distributed to the user terminal 12 with referring to the distribution list, and whether the content that is requested to send and the content that should be distributed are coincident with each other. If these are in agreement, the content server 18 transmits the content being requested to the user terminal 12 that is a source of request. Although the content is transmitted per packet, for example, there is no necessity of being limited to this. However, when additional information is added to the content to be transmitted, after transmitting the content, the additional information is also transmitted. In this embodiment, the additional information is a message from other users and information of a rating for the content that is provided by the administrator.

In addition, when there is no content that should be distributed or when the content that is requested to send and the content that should be distributed are not identical, the content server 18 does not transmit the content to the user terminal 12 that is the source of request.

Furthermore, when the user purchases the content, since approval (confirmation) of the rating is normally performed by the shopping server 22, in this embodiment, the information of the rating is not added to the content that the user purchases. However, when the approval of the rating is not performed by the shopping server 22, the information of the rating is added to the content.

In the user terminal 12, if the acquisition of the content is successful, the data value of the status information described in the download task of the content is set as "10". On the other hand, in the user terminal 12, if the acquisition of the content is unsuccessful, the data value of the status information described in the download task of the content is set as "01".

Although a detailed description is omitted, the user terminal 12 fails in acquisition of the content when connection with the content server 18 is disconnected during the acquisition of the content (during reception). For example, when a communication time with the content server 18 exceeds a predetermined time limit (10 minutes, for example), the communication is forcedly disconnected. However, the communication may be disconnected by a certain factor.

In addition, if the content is acquired newly, the user terminal 12 performs a different operation according to the task type of the download task of the content that is acquired. That is, the action (representation) in the user terminal 12 changes according to the task type of the download task. For example, when the task type of the download task is Type 1, no operation is performed for the content that is acquired newly. In addition, when the task type of the download task is Type 2, the message showing whether the content is presented by whom is displayed on the display. Furthermore, a message is also displayed when the message is added. Accordingly, it is possible to present the content to a friend or a family, for example, and to attach the message. However, as for the message, not only a text but a picture (photograph) may be included. Furthermore, when the task type of the download task is Type 3, the message indicating that the content is a content that is distributed (or presented in some cases) by the administrator is displayed on the display. Furthermore, when the information of the rating is added, the displaying of the rating is performed, and if consent of the user is obtained, the content is made performable.

In addition, these are examples, not to be limited, and it should be noted a point that the operation of the user terminal 12 differs according to the task type.

Figure 4:
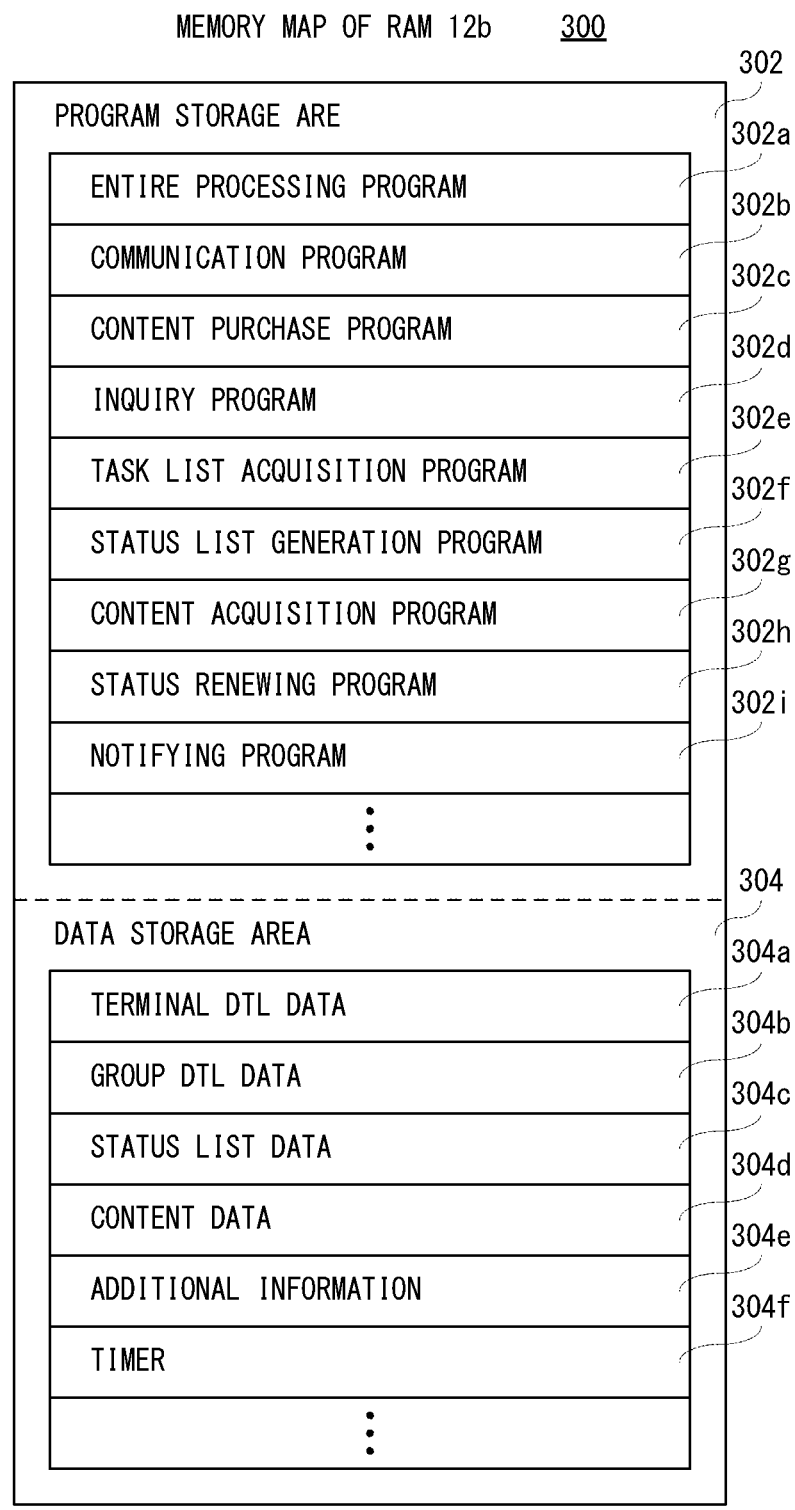
FIG. 4 is a view showing a non-limiting example memory map of a RAM incorporated in the user terminal shown in FIG. 1.

An example of a memory map 300 of the RAM 12b incorporated in the user terminal 12 shown in FIG. 1 is shown in FIG. 4. As shown in FIG. 4, the RAM 12b includes a program storage area 302 and a data storage area 304. The program storage area 302 is stored with an information processing program, and the information processing program is constituted by an entire processing program 302a, a communication program 302b, a content purchase program 302c, an inquiry program 302d, a task list acquisition program 302e, a status list generating program 302f, a content acquisition program 302g, a status renewing program 302h, a notifying program 302i, etc.

In addition, when the data (content data 304d) for the content that is acquired according to the content acquisition program 302g is program data, after being acquired, the data is developed (to executable format) into the program storage area 302 from the data storage area 304.

The entire processing program 302a is a program for performing overall processing of the user terminal 12. The communication program 302b is a program for accessing other computers (server or the like) to communicate with these other computers. The content purchase program 302c is a program for searching a content and determining a content that is to be obtained (purchased) according to instructions of the user through a communication with the shopping server 22 according to the communication program 302b.

The inquiry program 302d is a program for inquiring the existence/non-existence of the renewal of the download task list, and receiving the notice of the existence/non-existence of the renewal of the download task list by communicating with the revision server 20 according to the communication program 302b.

The task list acquisition program 302e is a program for acquiring the terminal DTL and the group DTL by communicating with the list server 16 according to the communication program 302b if the notice that the download task list is renewed according to the inquiry program 302d is received.

The status list generating program 302f is a program for generating (renewing) the task registration status list with using the terminal DTL and the group DTL that are acquired according to the task list acquisition program 302e.

The content acquisition programs 302g is a program for acquiring the content by communicating with the content server 18 according to the communication program 302b when there is a content that should be acquired with referring to the task registration status list.

The status renewing program 302h is a program for setting (renewing) the status information included in the download task of the content, which is described in the task registration status list according to a success or failure of the acquisition of the content.

The notifying program 302i is a program for performing a predetermined notice to the user according to the task type of the download task when the content is acquired. In addition, the notifying program 302i is also a program for notifying the additional information that is added to the content.

Although illustration is omitted, in the program storage area 302, programs for various functions performed in the user terminal 12 are also stored.

In addition, the terminal DTL data 304a, the group DTL data 304b, the status list data 304c, the content data 304d, and the additional information 304e are stored in the data storage area 304.

The terminal DTL data 304a is data of the download task list for the user terminal 12 itself acquired from the list server 16. The group DTL data 304b is data of the download task list for the group including the user terminal 12 itself acquired from the list server 16.

The status list data 304c is data of the task registration status list that is generated based on the terminal DTL indicated by the terminal DTL data 304a and the group DTL indicated by the group DTL data 304b. The content data 304d is data of the content that is acquired from the content server 18. The additional information 304e is data of the message or the information of the rating that are added to the content data 304d.

In addition, a timer 304f is provided in the data storage area 304. This timer 304f is a timer for counting a time interval (in this embodiment, 60 minutes) for inquiring of the revision server 20 whether the download task list is renewed.

Although illustration is omitted, other data required in order to execute the information processing may be stored in the data storage area 304, and other timers (counters) and flags may be provided in the data storage area 304.

Figure 5:
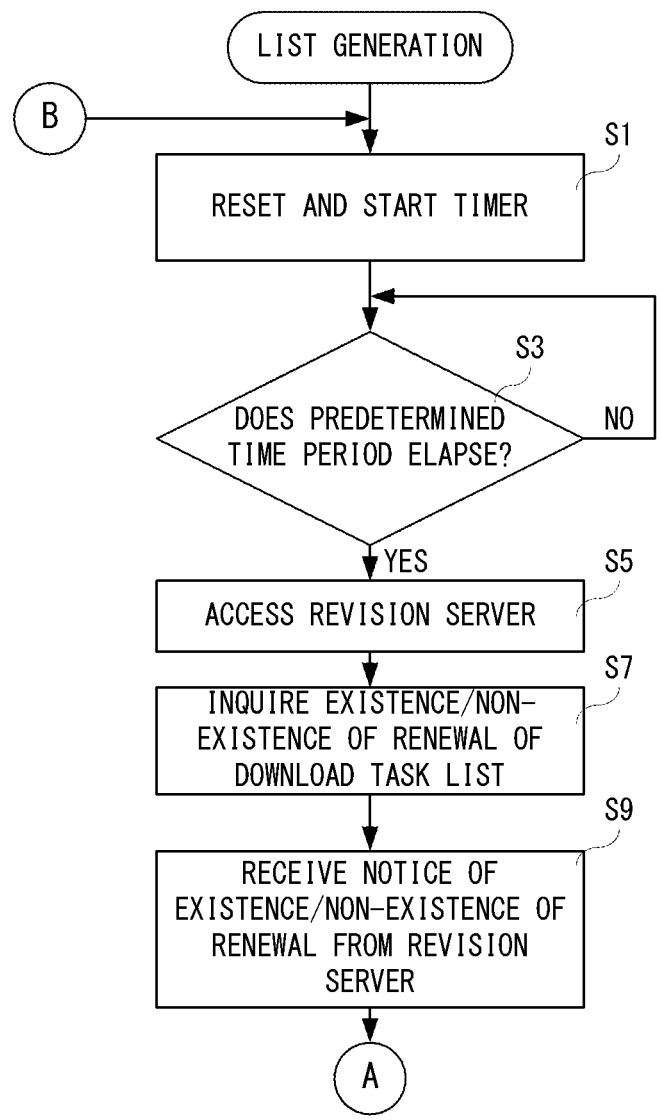
FIG. 5 is a flowchart showing a non-limiting example part of list generation processing of a CPU of the user terminal shown in FIG. 1.
Figure 6:
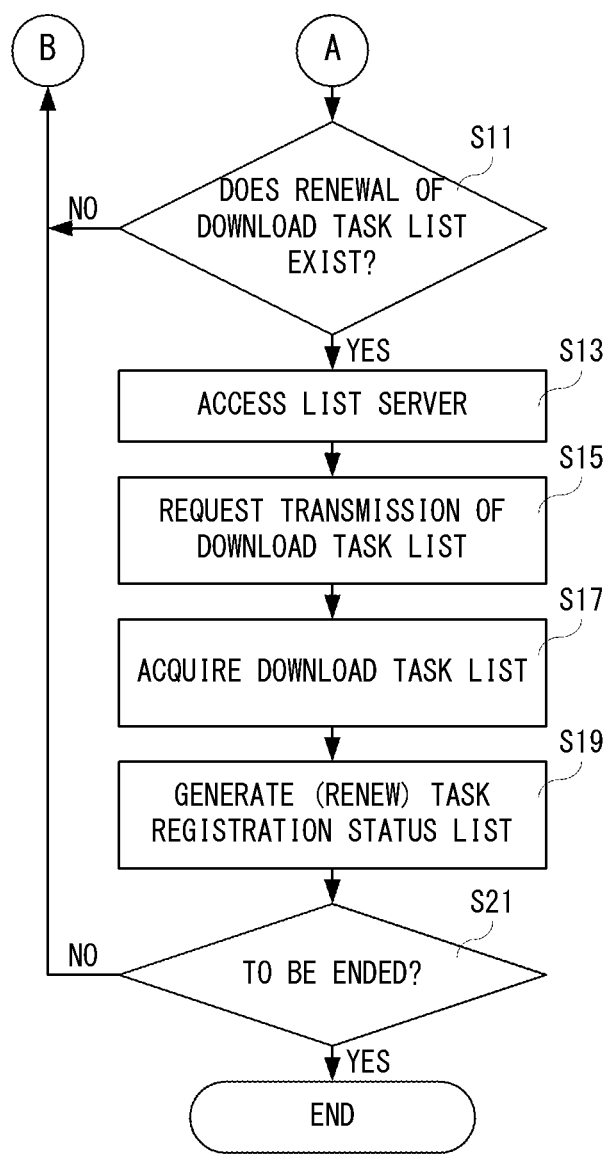
FIG. 6 is a flowchart showing another non-limiting example part of the list generation processing of the CPU of the user terminal shown in FIG. 1, following FIG. 5.

FIG. 5 and FIG. 6 are flowcharts showing the list generation processing by the CPU 12a of the user terminal 12 shown in FIG. 1. For example, the CPU 12a starts the list generation processing, when the user terminal 12 comes into the sleep state. However, when instructed by the user, that CPU 12a also starts the list generation processing. In this case, steps S1 and S3 described later are skipped.

As shown in FIG. 5, if the list generation processing is started, the CPU 12a resets and starts the timer 304f in the step S1. In the next step S3, it is determined whether the predetermined time period (in this embodiment, 60 minutes) elapses. Here, the CPU 12a determines whether a count value of the timer 304f reaches 60 minutes. If "NO" is determined in the step S3, that is, if the predetermined time period does not elapse, the process returns to the same step S3.

On the other hand, if "YES" is determined in the step S3, that is, if the predetermined time period elapses, the CPU 12a accesses the revision server 20 in a step S5. In a next step S7, the CPU 12a inquires of the revision server 20 the existence/non-existence of the renewal of the download task list (in this embodiment, the terminal DTL and the group DTL). Then, the CPU 12a receives the notice on the existence/non-existence of the renewal of the download task list from the revision server 20 in a step S9, and the process proceeds to a step S11 shown in FIG. 6.

As shown in FIG. 6, in a step S11, it is determined whether the renewal of the download task list exists. Here, the CPU 12a determines whether the renewal information that is notified from the revision server 20 indicates that there is the renewal. If "NO" is determined in the step S11, that is, if the download task list (both the terminal DTL and the group DTL) is not renewed, the process returns to the step S1 shown in FIG. 5 with no operation. However, when there is no response from the revision server 20, "NO" is also determined in the step S11 in this embodiment, but "YES" may be determined in such a case.

On the other hand, if "YES" is determined in the step S11, that is, if the download task list (at least one of the terminal DTL and the group DTL) is renewed, the CPU 12a accesses the list server 16 in a step S13, and requests the list server 16 transmission of the download task list in a step 15. Then, the CPU 12a acquires the download task list from the list server 16 in a step S17. That is, the CPU 12a receives the terminal DTL data 304a and the group DTL data 304b that are transmitted from the list server 16, and stores them into the RAM 12b. Although the user terminal 12 acquires both the terminal DTL data 304a and the group DTL data 304b in this embodiment, only renewed data may be acquired.

In addition, although it is described here that the user terminal 12 accesses the list server 16 and surely acquires the download task list, in a case where it is impossible to access the list server 16 or a case where it is impossible to acquire the download task list, the processing of the steps S13, S15 and S17 may be repeatedly performed.

In a next step S19, the task registration status list is generated (renewed). The CPU 12a generates the task registration status list with using the terminal DTL data 304a and the group DTL data 304b that are acquired from the list server 16, and stores the status list data 304c into the RAM 12b. Then, it is determined whether the list generation processing is to be ended in a step S21. Here, the CPU 12a determines whether it is instructed that the user terminal 12 is started. However, when the user terminal 12 starts the list generation processing according to instructions of the user in its active state, "YES" is determined in the step S21.

If "NO" is determined in the step S21, that is, if not ending the list generation processing, the process returns to the step S1. On the other hand, if "YES" is determined in the step S21, that is, if ending the list generation processing, the list generation processing is ended with no operation.

Figure 7:
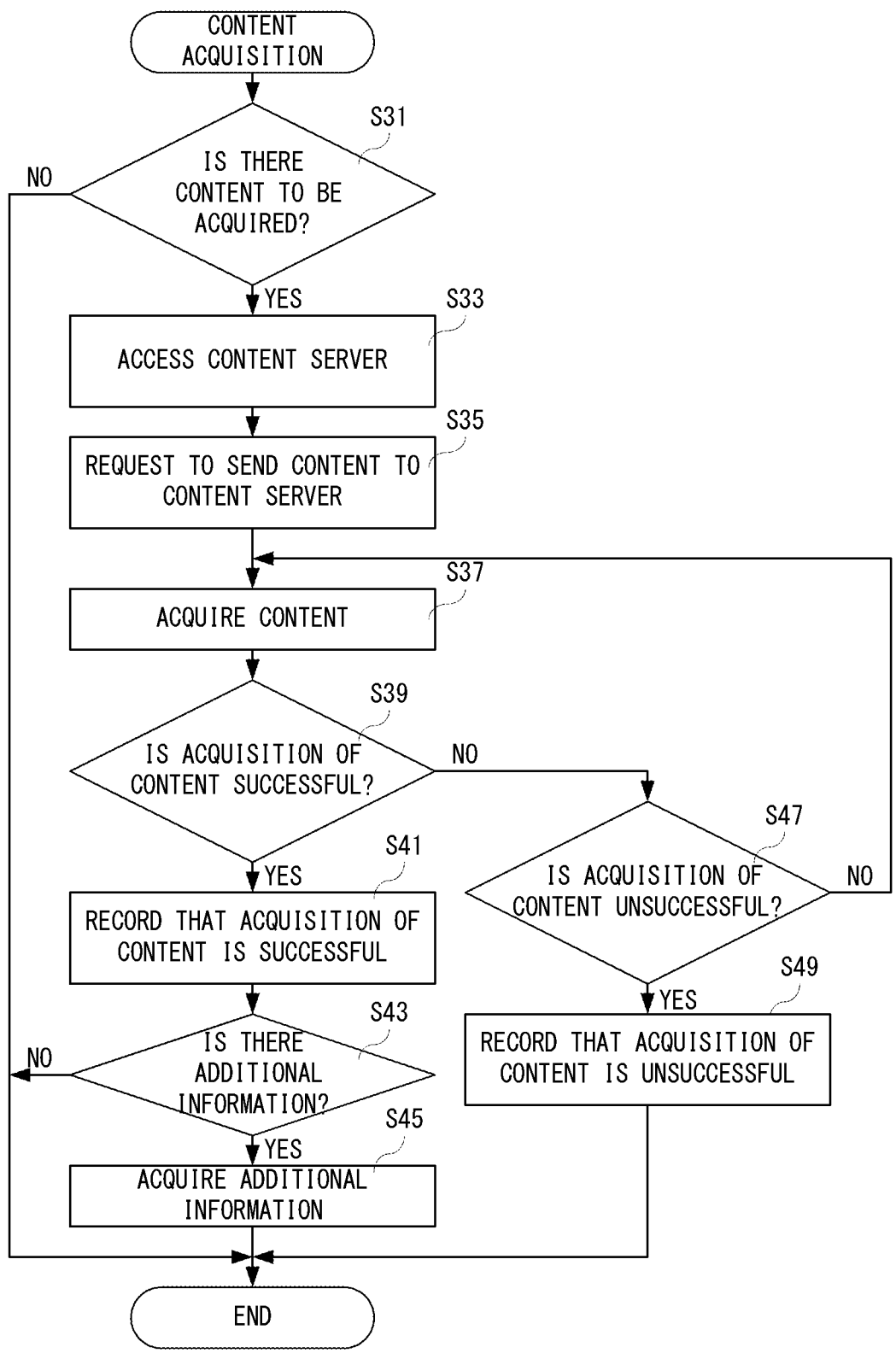
FIG. 7 is a flowchart showing a non-limiting example content acquisition processing of the CPU of the user terminal shown in FIG. 1.

FIG. 7 is a flowchart showing the content acquisition processing by the CPU 12a of the user terminal 12 shown in FIG. 1. This content acquisition processing is performed at every predetermined time (in this embodiment, 60 minutes), and when the list generation processing shown in FIG. 5 is being performed, performed in parallel with the list generation processing. However, the content acquisition processing may be performed at a predetermined timing like a timing of starting or ending of the user terminal 12.

As shown in FIG. 7, the CPU 12a determines whether there is a content that should be acquired in a step S31 when the content acquisition processing is started. Here, the CPU 12a determines, with referring to the status list data 304c, whether there is a download task that the data value of the status information indicates "00" or "01".

If "NO" is determined in the step S31, that is, if there is no content that should be acquired, the content acquisition processing is ended with no operation. On the other hand, if "YES" is determined in the step S31, that is, if there is a content that should be acquired, processing after a step S33 is performed. However, when there are a plurality of contents that should be acquired, the processing after the step S33 is performed for each content.

In the step S33, the CPU 12a accesses the content server 18 according to the URL of the distribution source. However, the processing in the step S33 is repeatedly performed when it is impossible to access the content server 18. In a next step S35, the content server 18 is requested the transmission of the content. Then, the CPU 12a acquires (receives) the content that is transmitted from the content server 18 in a step S37. That is, the CPU 12a receives the content data 304d, and stores the same into the RAM 12b. For example, the content data 304d is transmitted per packet.

Subsequently, in a step S39, it is determined whether the acquisition of the content is successful. That is, the CPU 12a determines whether the content data 304d is received completely. If "YES" is determined in the step S39, that is, if the acquisition of the content is successful, in a step S41, a success is recorded in the download task of the content is recorded. That is, in the step S41, the CPU 12a sets "10" of the data value of the status information included in the download task of the content that is acquired. Then, it is determined whether there is additional information in a step S43. If "NO" is determined in the step S43, the content acquisition processing is ended with no operation. On the other hand, if "YES" is determined in the step S43, that is, if there is the additional information, the additional information is acquired in a step S45, and the content acquisition processing is ended. In the step S45, if the additional information 304e is received from the content server 18, the CPU 12a stores the additional information 304e in the RAM 12b with relating to the content that is previously acquired.

On the other hand, if "NO" is determined in the step S39, that is, if the acquisition of the content is not successful, it is determined whether the acquisition of the content is failed in a step S47. Here, the CPU 12a determines whether the communication time limit is exceeded before completely receiving the content data 304d or whether the communication is disconnected by a certain factor during the reception of the content data 304d.

If "NO" is determined in the step S47, that is, if the acquisition of the contents is not failed, the process returns to the step S37 by determining during the acquisition of the content data 304d (during the reception). On the other hand, if "YES" is determined in the step S47, that is, if the acquisition of the content is failed, the failure of the download task of the content is recorded in a step S49, and the content acquisition processing is ended. That is, in the step S49, the CPU 12a sets the data value "01" of the status information included in the download task of the content that is the acquisition is unsuccessful.

Figure 8:
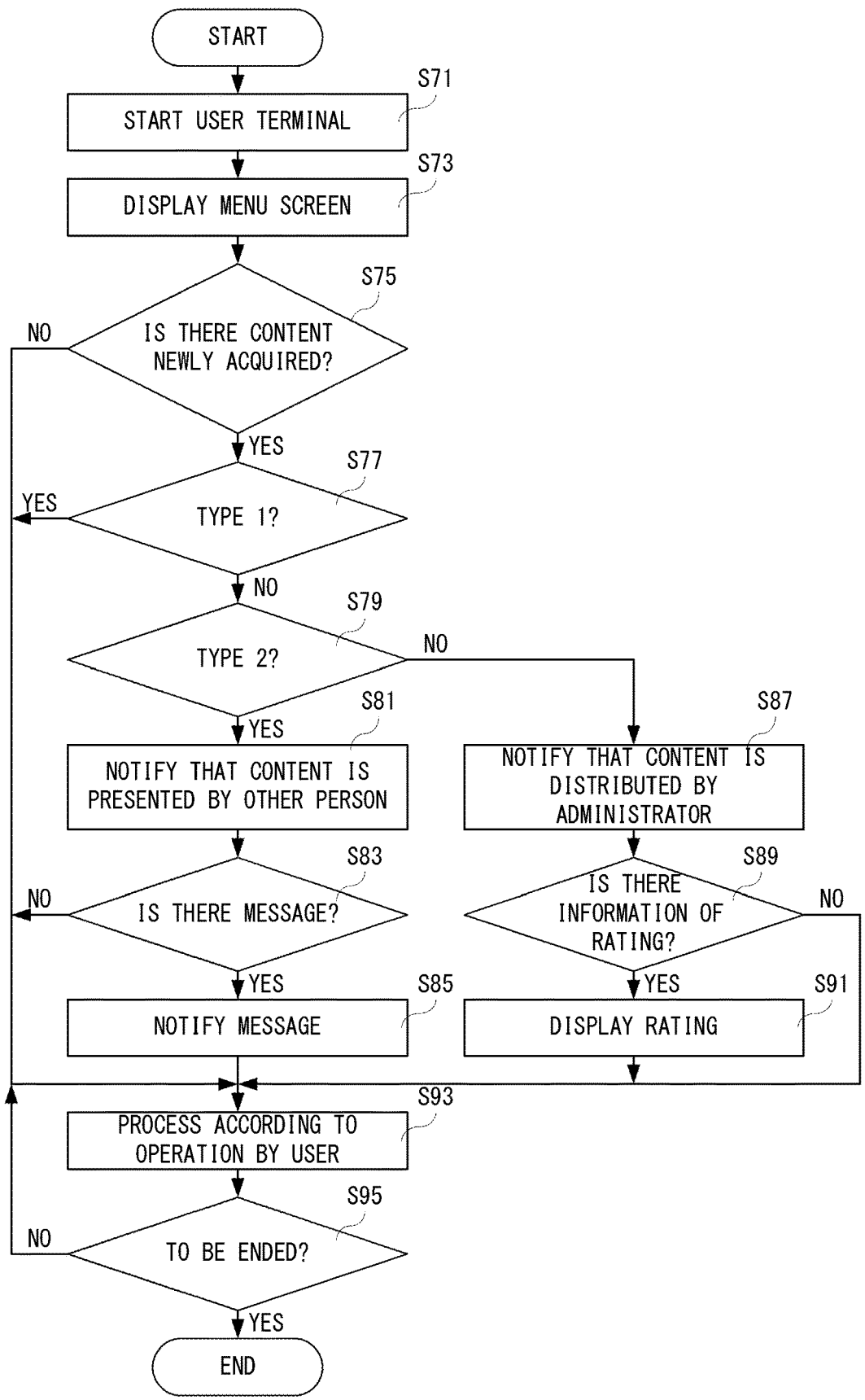
FIG. 8 is a flowchart showing a non-limiting example entire processing of the CPU of the user terminal shown in FIG. 1.

FIG. 8 is a flowchart showing an example of the entire processing of the CPU 12a of the user terminal 12 shown in FIG. 1. If the user instructs starting of the user terminal 12, the CPU 12a starts the entire processing, and in a step S71, starts the user terminal 12. That is, the user terminal 12 is shifted to the active state from the sleep state. In a next step S73, a menu screen is displayed on the display. Then, it is determined whether there is a content that is newly acquired in a step S75.

If "NO" is determined in the step S75, that is, if there is no newly acquired content, the process proceeds to a step S93 with no operation. On the other hand, if "YES" is determined in the step S75, that is, if there is a content that is newly acquired, processing after a step S77 is performed. However, when there are a plurality of newly acquired contents, the processing after the step S77 is performed for each content.

In the step S77, it is determined whether the task type of the download task of the newly acquired content is Type 1. That is, it is determined whether the content is a content that the user who possesses the user terminal 12 determines to acquire for himself/herself.

If "YES" is determined in the step S77, that is, if the task type is Type 1, the process proceeds to the step S93 with no operation. On the other hand, if "NO" is determined in the step S77, that is, if the task type is not Type 1, it is determined whether the task type of the download task of the newly acquired content is Type 2 in a step S79. That is, it is determined whether the content is a content that is presented by a user (other person) not the user who is operating the user terminal 12.

If "YES" is determined in the step S79, that is, if the task type is Type 2, it is notified that the content is presented by other person in a step S81. That is, the CPU 12a displays the message that the content is presented by other person on the display in the step S81.

In a succeeding step S83, it is determined whether there is a message. That is, the CPU 12a determines whether the additional information 304e related to the newly acquired content is stored. If "NO" is determined in the step S83, that is, if there is no message, the process proceeds to the step S93 with no operation. On the other hand, if "YES" is determined in the step S83, that is, if there is a message, the message is notified in a step S85, and the process proceeds to the step S93. That is, the CPU 12a displays the message from the presenter of the content on the display in the step S85.

In addition, if "NO" is determined in the step S79, that is, if the task type is Type 3, it is determined that the content is a content that is distributed by the administrator of the content server 18, and it is notified that the content is a content that is distributed by the administrator in a step S87. That is, the CPU 12a displays the message that the content is a content that is distributed by the administrator on the display in the step S87.

In a succeeding step S89, it is determined whether there is any information of the rating. That is, the CPU 12a determines whether the additional information 304e related to the newly acquired content is stored. If "NO" is determined in the step S89, that is, if there is no information of the rating, the process proceeds to the step S93 with no operation. On the other hand, if "YES" is determined in the step S89, that is, if there is the information of the rating, the information of the rating is displayed on the display in the step S91, and the process proceeds to the step S93. Although a detailed description is omitted, the operation for approval, etc. is performed by the user after that.

In the step S93, the processing is performed according to the operation of the user. For example, an application program selected in the menu is started, or the information processing in an application is performed. This application includes a shopping application. Accordingly, in performing the shopping application, the user terminal 12 accesses the shopping server 22, and can search a content, or determine to acquire (purchase) a content, or input a message according to instructions of the user.

Subsequently, in a step S95, it is determined whether to be ended. Here, the CPU 12a determines whether instructions of the end is input by the user. That is, it is determined whether to be shifted to the sleep state. If "NO" is determined in the step S91, that is, if not to be ended, the process returns to the step S89. On the other hand, if "YES" is determined in the step S91, that is, if to be ended, the entire processing is ended. Accordingly, the user terminal 12 is shifted to the sleep state, and as mentioned above, the list renewing processing (FIG. 5 and FIG. 6) is started.

In accordance with this embodiment, since the user terminal acquires the download task list, and the content is downloaded according to the task registration status list that is generated from the download task list, it is not necessary for the list server to manage the acquisition of the content in the user terminal, and the processing load on the side of the list server can be reduced.

In addition, since the terminal DTL and the group DTL are provided, the content that is commonly distributed to the plurality of user terminals constituting a group may be registered in the group DTL and not needed to be registered in the terminal DTL, there is no necessity of managing all the download task lists per user terminal, and therefore, it is possible to drastically reduce trouble of registration of the download task.

Furthermore, since it is possible to manage the content that should be distributed for each group by the group DTL in this embodiment, there is no necessity of installing (pre-installation) the content in the user terminal 12 per group before factory shipments. For example, it is possible to make the user acquire the content that is conventionally pre-installed after the purchase of the user terminal 12. Accordingly, since there is no trouble for preparing the user terminal 12 for each group before factory shipments, it is possible to drastically reduce the burden on the side of the seller (provider) of the user terminal 12.

In addition, although the game machine is mentioned as an example of a user terminal in this embodiment, there is no necessity of being limited to this. A general-purpose PC, a feature phone or a smartphone may be sufficient as a user terminal.

In addition, although various servers are provided according to uses in this embodiment, it is possible to gather up any two or all of the list server, the content server and the shopping server to one server except for the revision server. For example, by gathering up the list server and the content server to one server, it is possible to function the one server as a server that distributes the download task list and the content.

Furthermore, although the terminal DTL and the group DTL are managed by the list server in this embodiment, these may be managed by another server. Since it is not necessary to manage all download task lists for each user terminal even if in such a case, the processing load on the side of the server can be reduced.

Furthermore, although the user terminal acquires the download task list and acquires the content according to this download task list in this embodiment, there is no necessity of being limited to this. For example, the list server may apply the distribution instructions of the content to the content server according to the download task list, and the content may be distributed to the user terminal. When providing the server that gathers up the list server and the content server to one as mentioned above, it is possible to complete the distribution instructions of the content and the distribution of the content by one server. However, when the content is distributed according to the instructions of the list server, it is necessary to notify the task type to the user terminal from the list server. This is because the operation (action) on the side of the user terminal differs according to the task type.

In addition, although the terminal DTL and the group DTL are managed for each user terminal so as to distribute to the user terminal in this embodiment, there is no necessity of being limited to this. For example, while the download task list is managed for each user, the download list is managed per group that a plurality of the users are classified so as to distribute to the user terminal. In this case, in place of the terminal ID, the user ID or the network ID is applied to the download task list. However, the group ID is the identification information of the group that classifies a plurality of the users. In this case, the user ID of the user who should acquire the content as the acquirer ID included in the group DTL is described. If doing in this way, by identifying the user who is using the user terminal, it is possible to inquire existence/non-existence of renewal of the download task list for each user, to acquire the download task list, and to acquire the content. For example, when classifying the users into groups, it is possible to classify with using various attribute information such as an application that the user uses, a sex of the user, age (generation), a hobby (idea), etc.

Furthermore, specific numeral values shown in this embodiment are only examples, and may be suitably changed according to an actual product.

The systems, devices and apparatuses described herein may include one or more processors that may be located in one place or distributed in a variety of places communicating via one or more networks. Such processor(s) can, for example, use conventional 3D graphics transformations, virtual camera and other techniques to provide appropriate images for display. By way of example and without limitation, the processors can be any of: a processor that is part of or is a separate component co-located with the stationary display and that communicates remotely (e.g., wirelessly) with the movable display; or a processor that is part of or is a separate component co-located with the movable display and communicates remotely (e.g., wirelessly) with the stationary display or associated equipment; or a distributed processing arrangement some of that is contained within the movable display housing and some of that is co-located with the stationary display, the distributed portions communicating together via a connection such as a wireless or wired network; or a processor(s) located remotely (e.g., in the cloud) from both the stationary and movable displays and communicating with each of them via one or more network connections; or any combination or variation of the above.

The processors can be implemented using one or more general-purpose processors, one or more specialized graphics processors, or combinations of these. These may be supplemented by specifically-described ASICs (application specific integrated circuits) and/or logic circuitry. In the case of a distributed processor architecture of arrangement, appropriate data exchange and transmission protocols are used to provide low latency and maintain interactivity, as will be understood by those skilled in the art.

Similarly, program instructions, data and other information for implementing the systems and methods described herein may be stored in one or more on-board and/or removable memory devices. Multiple memory devices may be part of the same device or different devices, which are co-located or remotely located with respect to each other.

While certain example systems, methods, storage media, devices and apparatuses have been described herein, it is to be understood that the appended claims are not to be limited to the systems, methods, storage media, devices and apparatuses disclosed, but on the contrary, are intended to cover various modifications and equivalent arrangements included within the spirit and scope of the appended claims.

What is claimed is:

1. An information processing system comprising a content server, a renewal server, a list server, and a user terminal, wherein:
the content server comprises:
storage configured to store content;
first communication circuitry; and
first processing circuitry configured to control the content server to at least:
receive, via the first communication circuitry, from the user terminal, requests for content from the user terminal; and
transmit, via the first communication circuitry, to the user terminal, in response to the requests, content from the storage, and
wherein the user terminal comprises:
second communication circuitry; and
second processing circuitry configured to control the first user terminal to at least:
determine, by accessing the revision server, a renewal of a download task list comprising one or more download tasks for downloading content, the download tasks comprising information for download operations for the user terminal for downloading content; and
when renewal of the download task list is determined:
acquire, by accessing the list server, the download task list;
generate a task status list for the download tasks in the download task list;
access, via requests based on the task status list, the content server to acquire content; and
update the task status list based on whether content acquisition for a particular download task is successful or unsuccessful.

2. The information processing system according to claim 1, wherein the second processing circuitry is further configured to acquire additional information that is added to the content.

3. The information processing system according to claim 1, wherein the download tasks comprise different types of download tasks.

4. The information processing system according to claim 3, wherein the second processing circuitry is configured to perform different operations at a time that content is acquired according to the type of download task.

5. The information processing system according to claim 3, wherein different identification information is applied to each of the download tasks in the download task list, and the second processing circuitry is configured to manage whether each of the download tasks is to be performed based on the identification information.

6. The information processing system according to claim 5, wherein the second processing circuitry is further configured to record, when content is successfully acquired, that the acquisition of the content is successful in correspondence with the identification information of the download task for the content.

7. The information processing system according to claim 6, wherein content is not requested when it is recorded in correspondence with the identification information of the download task that the acquisition of the content is successful.

8. The information processing system according to claim 5, wherein the second processing circuitry is further configured to record, when the acquisition of the content is unsuccessful, that the acquisition of the content is unsuccessful in correspondence with the identification information of the download task for the content.

9. The information processing system according to claim 8, wherein content is requested again when it is recorded that the acquisition of the content is unsuccessful in correspondence with the identification information of the download task.

10. An information processing method in an information processing system comprising a list server, a revision server, and a content server including storage configured to store content, the method comprising:
determining, by accessing the revision server, a renewal of a download task list comprising one or more download tasks for downloading content, the download tasks comprising information for download operations for the user terminal for downloading content; and
when renewal of the download task list is determined:
acquiring, by accessing the list server, the download task list;
generating a task status list for the download tasks in the download task list;
accessing, based on the task status list, a content server to acquire content; and
updating the task status list based on whether content acquisition for a particular download task is successful or unsuccessful.

11. A non-transitory computer readable storage medium storing an information processing program of a user terminal that is included in a system comprising a list server, a revision server, and a content server that comprises:
storage configured to store content,
wherein the information processing program causes a computer of the user terminal to perform operations comprising:
determining, by accessing the revision server, a renewal of a download task list comprising one or more download tasks for downloading content, the download tasks comprising information for download operations for the user terminal for downloading content; and
when renewal of the download task list is determined:
acquiring, by accessing the list server, the download task list;
generating a task status list for the download tasks in the download task list;
accessing, based on the task status list, a content server to acquire content; and
updating the task status list based on whether content acquisition for a particular download task is successful or unsuccessful.

12. A terminal apparatus comprising:
communication circuitry; and
processing circuitry configured to control the terminal apparatus to perform operations comprising:
determining, by accessing a revision server, a renewal of a download task list comprising one or more download tasks for downloading content, the download tasks comprising information for download operations for a user terminal for downloading content; and
when renewal of the download task list is determined:
acquiring, by accessing a list server, the download task list;

generating a task status list for the download tasks in the download task list;

accessing, based on the task status list, a content server to acquire content; and updating the task status list based on whether content acquisition for a particular download task is successful or unsuccessful.

13. A system comprising the terminal apparatus, the revision server, the list server and the content server of claim 12.

14. The system according to claim 13, wherein the list server and the content server are provided as one server separate from the revision server.

* * * * *